United States Patent
Long

(10) Patent No.: US 10,306,980 B2
(45) Date of Patent: Jun. 4, 2019

(54) LOW PROFILE POWERED OVERHEAD STORAGE SYSTEMS AND METHODS

(71) Applicant: Anthony Long, Winston Salem, NC (US)

(72) Inventor: Anthony Long, Winston Salem, NC (US)

(*) Notice: Subject to any disclaimer, the term of this patent is extended or adjusted under 35 U.S.C. 154(b) by 0 days.

(21) Appl. No.: 15/386,292

(22) Filed: Dec. 21, 2016

(65) Prior Publication Data

US 2018/0168338 A1    Jun. 21, 2018

(51) Int. Cl.
*A47H 1/10*    (2006.01)
*A47B 51/00*   (2006.01)
*F16M 13/02*   (2006.01)

(52) U.S. Cl.
CPC .......... *A47B 51/00* (2013.01); *F16M 13/027* (2013.01); *A47B 2051/005* (2013.01)

(58) Field of Classification Search
CPC .............. A47B 51/00; A47B 2051/005; F16M 13/027; B60D 1/28; B60D 1/12
USPC .......................................... 254/264; 248/329
See application file for complete search history.

(56) References Cited

U.S. PATENT DOCUMENTS

| | | | | |
|---|---|---|---|---|
| 5,261,347 A | * | 11/1993 | Mansfield | B63C 3/06 114/268 |
| 2004/0120798 A1 | * | 6/2004 | Davis | B66C 1/12 414/268 |
| 2007/0264098 A1 | * | 11/2007 | Chou | B60P 7/083 410/103 |
| 2015/0071725 A1 | * | 3/2015 | Anderson | B60P 3/077 410/3 |
| 2017/0015535 A1 | * | 1/2017 | Haddix, II | B66D 1/28 |

* cited by examiner

*Primary Examiner* — Todd M Epps
(74) *Attorney, Agent, or Firm* — Ben Schroeder Law PLLC

(57) ABSTRACT

A quick and efficient method to raise and lower a storage platform, storage container, and/or storage box into any unused overhead space is disclosed. The design comprises a low profile philosophy allowing the storage platform, storage container, and/or storage box to be positioned more closely to the ceiling making better use of any overhead space such as the limited space directly above a garage door. The system relies on a main drive shaft that is designed to allow one or more belts to pass through the main drive shaft thereby creating a base around which the one or more belts can wrap. The present invention is superior to those of the prior art in that there are no weak points found in this system in contrast to those found in cable systems connected to a drum or a flat fiber reinforced strap bolted to a drum. The one or more lifting straps do not terminate on the main drive shaft as do other systems via a wire drum or flat drum but simply passes through the main drive shaft.

16 Claims, 5 Drawing Sheets

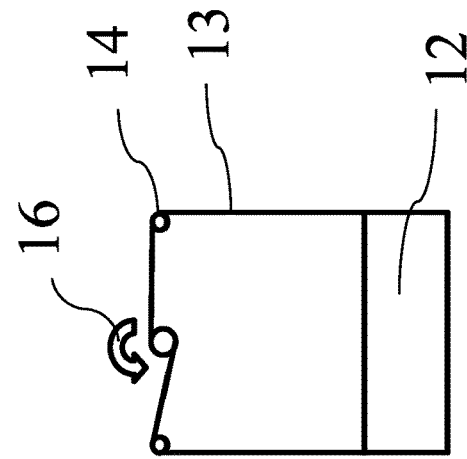
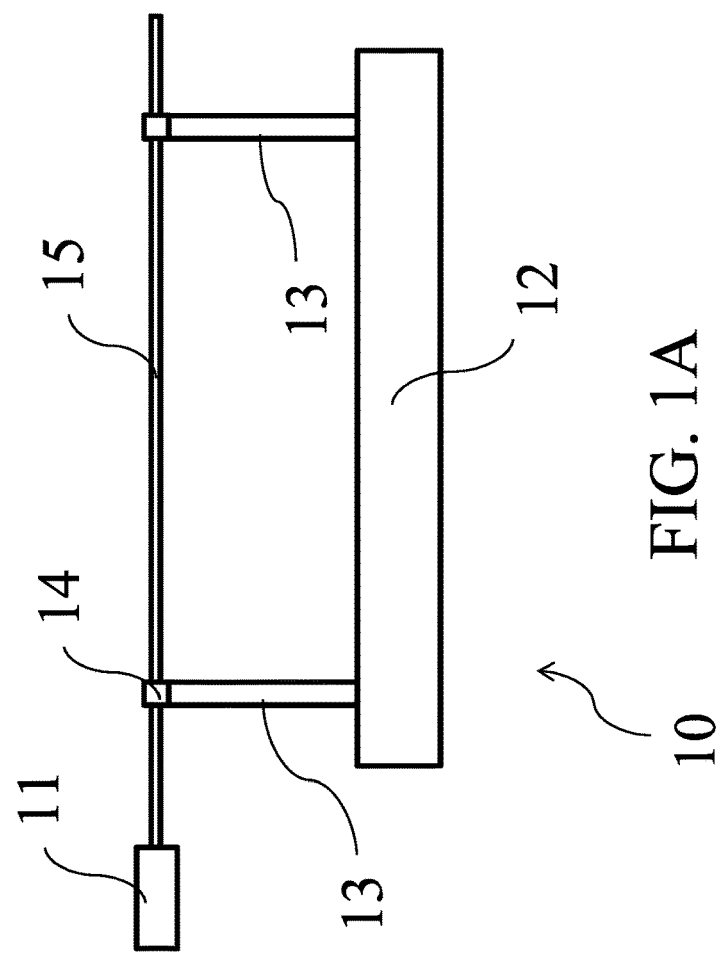
FIG. 1B
FIG. 1A

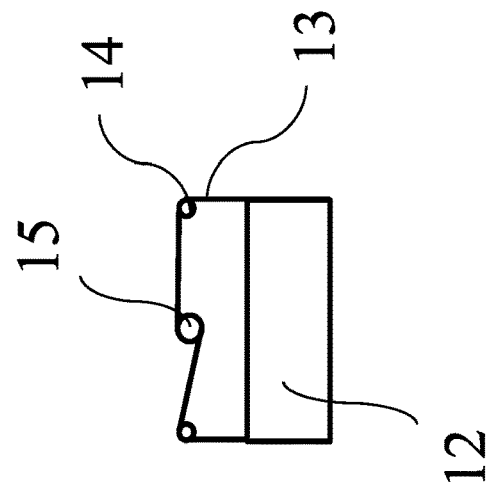
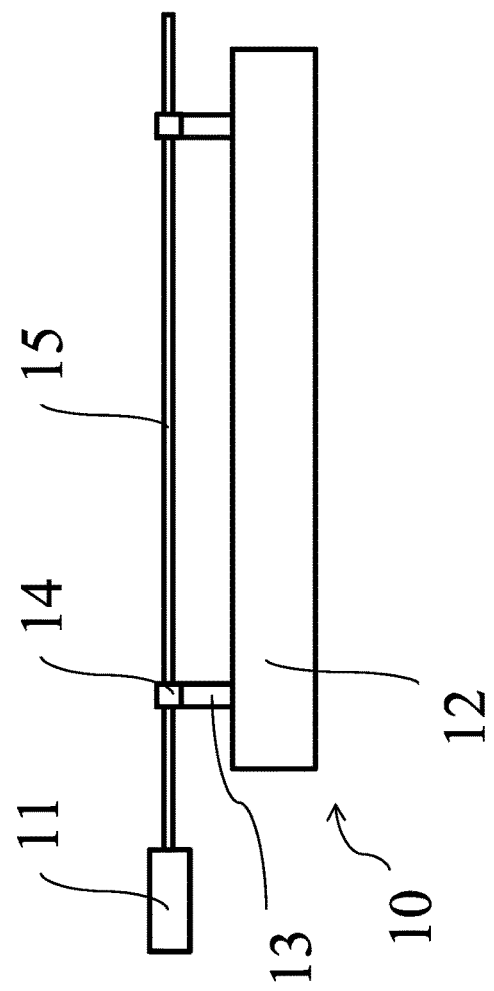
FIG. 2B
FIG. 2A

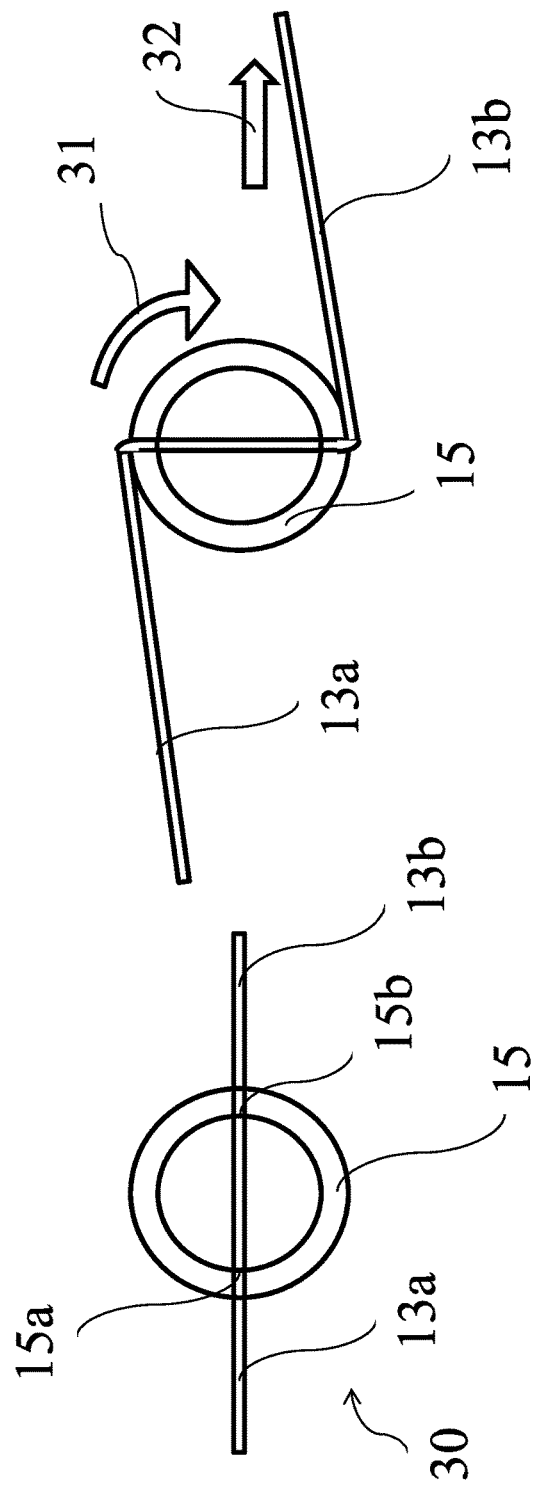

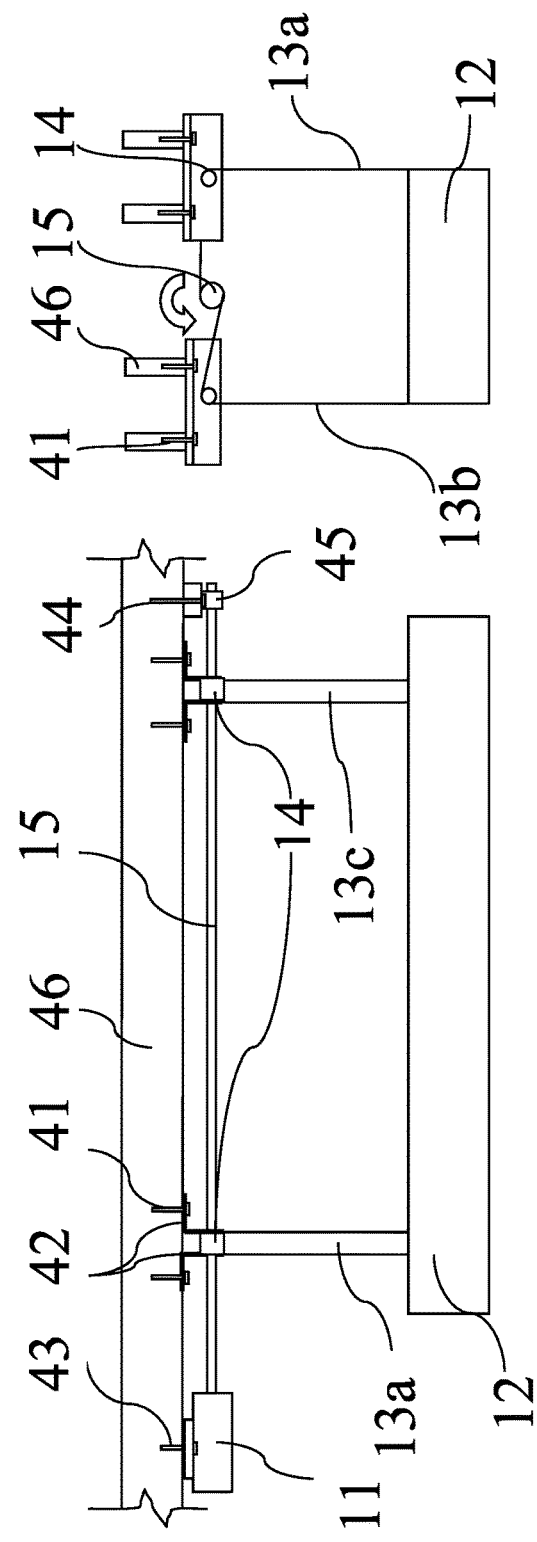

US 10,306,980 B2

LOW PROFILE POWERED OVERHEAD STORAGE SYSTEMS AND METHODS

FIELD OF THE INVENTION

This invention relates to systems and methods that utilize unused overhead space and makes use of a storage platform, storage container, and/or a storage box lifted by a mechanized system supported by overhead rafters, joists, or the building's main structure. In an embodiment, this invention relates to the raising and lowering of a storage container, storage platform, or storage box into any unused overhead space such as found in a typical garage, space above garage door, workshop, or other similar premises. Specifically, the invention relates to a novel technique for the raising and lowering of a storage container, storage platform, or storage box to better use any unused overhead space by an integrated mechanism that controls the raising and lower by an operator controlled device.

BACKGROUND OF THE INVENTION

Conventional storage systems are comprised of fixed shelving either supported by the floor, wall, or ceiling. These storage systems are fixed and rigid and limited in height and depth and by one's ability to reach all areas of the shelving. Fixed systems like these can be found throughout the home to include the garage area and offer homeowners the ability to add storage. However, these systems, if they are present as overhead storage systems, do not provide easy access to the homeowner who desires to store goods. The homeowner sometimes is required to lift heavy objects and/or goods to properly store the objects/goods in the storage space, thereby providing the opportunity to cause back, neck, or other injuries to the homeowner.

Some garage storage systems make use of a hoist to raise and lower a platform via a single cable, while other hoists make use of garage door drums and multiple steel cables to lift a single storage platform. These systems require one drum for every cable used to lift the platform when using multiple anchor points attached to the platform. Additionally, each drum must be keyed to a drive shaft securely to ensure that there is no slippage between the drum and the shaft. Additionally, these types of hoist systems reduce the amount of available overhead space as a result of the large drums, shaft, and anchor points of the platform take up overhead space and the inability to pull the platform close to the ceiling that the system is mounted to. Thus, it is with these drawbacks in mind that the overhead storage system of the present invention was developed.

SUMMARY OF THE INVENTION

The systems and methods of this invention center on the innovative concept of providing a quick and efficient method to raise and lower a storage platform, storage container, or storage box into any unused overhead space. Furthermore, the design embodies a low profile philosophy allowing the storage platform, storage container, and/or storage box to be positioned more closely to the ceiling making better use of any overhead space such as the limited space directly above a garage door. The system does not use a drum to wrap a steel cable around or a large drum to wrap a flat fiber reinforced belt around. Rather, the main drive shaft is designed to allow one or more belts to pass through the main drive shaft thereby creating a base around which the belt can wrap. In this new invention, there are no weak points found in this system in contrast to those found in a cable system connected to a drum or a flat fiber reinforced strap bolted to a drum. This system is designed such that the one or more lifting straps do not terminate on the main drive as do other systems via a wire drum or flat drum but simply passes through the main drive shaft.

BRIEF DESCRIPTION OF THE DRAWINGS

FIGS. 1A and 1B are an illustration of the method and system of this invention showing a simplified side-view (1A) and an end view (1B) of the system in the lowered position.

FIGS. 2A and 2B are an illustration of the method and system of this invention showing a simplified side-view (2A) and end view (2B) diagram of a system in the raised position.

FIGS. 3A and 3B are an illustration of the method and system of this invention showing a detailed cross section view of the lifting strap passing through the main shaft from the side view with the lifting straps fully extended (3A) and with the lifting straps starting to wrap around the main drive shaft (3B).

FIGS. 4A and 4B show the overhead storage system in the lowered position from side view (4A) and an end view (4B), with the system shown how it can be attached to an overhead structure.

DETAILED DESCRIPTION OF THE INVENTION

Figure 5B:
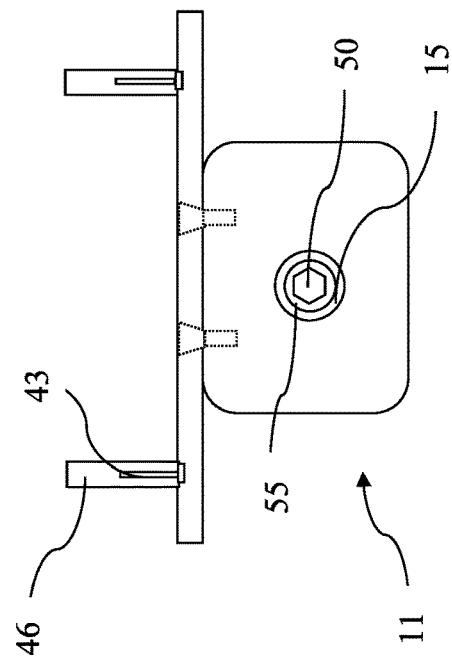
FIGS. 5A and 5B show the lifting motor from a side view (5A) and an end view (5B) with the main drive shaft emanating therefrom.

The systems and methods of this invention center on the innovative concept of providing a quick and efficient method to raise and lower a storage platform, storage container, or storage box into any unused overhead space. Furthermore, the design embodies a low profile philosophy allowing the storage platform, storage container, and/or storage box to be positioned more closely to the ceiling making better use of any overhead space such as the limited space directly above a garage door. The system does not use a drum to wrap a steel cable around or a large drum to wrap a flat fiber reinforced belt around. Rather, the main drive shaft is designed to allow one or more belts to pass through the main drive shaft thereby creating a base around which the belt can wrap. In this new invention, there are no weak points found in this system in contrast to those found in a cable system connected to a drum or a flat fiber reinforced strap bolted to a drum. This system is designed such that the one or more lifting straps do not terminate on the main drive as do other systems via a wire drum or flat drum but simply passes through the main drive shaft.

A clear understanding of the key features of the invention summarized above may be had by reference to the appended drawings, which illustrate the method and system of the invention, although it will be understood that such drawings depict preferred embodiments of the invention and, therefore, are not to be considered as limiting its scope with regard to other embodiments which the invention is capable of contemplating. It should be understood that the figures are merely meant to be illustrative of the invention and are in no way meant to limit the invention.

FIG. 1A shows a side view of the invention with the overhead storage system 10 in the lowered position. FIG. 1B shows an end view of the invention with the overhead storage system in the lowered position. In FIG. 1A, there exists a lifting motor 11, one or more lifting straps 13, a main drive shaft 15, a storage box/container 12, and one or more rollers 14 that engage the one or more lifting straps 13 allowing the storage box/container 12 to be raised and lowered. When the overhead storage system 10 is in the lowered position, the lifting straps 13 have more strap that is not wrapped around the main drive shaft 15 meaning that the one or more lifting straps are in a more extended position than when they are in the raised position (compare FIGS. 1A and 1B to FIGS. 2A and 2B). When the one or more lifting straps 13 are in there more extended position, the storage box/container 12 is in a lowered position allowing an individual to easily place goods/objects into the storage box/container 12. After loading goods/objects into the storage box/container 12, the overhead storage system 10 can be raised so that the overhead storage system 10 is in the raised position allowing storage of the goods/objects.

The overhead storage system 10 works by having the lifting motor 11 turn the main drive shaft 15 in a direction that is shown by arrow 16 (see FIG. 1B) around an axis that is along the length of the main drive shaft 15. The main drive shaft 15 has holes or slits in it that allow the one or more lifting straps 13 to pass through the main drive shaft 15 (see FIGS. 1B and 3A and 3B). When the main drive shaft 15 turns in the direction of arrow 16, the one or more lifting straps 13 wrap around the main drive shaft 15 meaning that the amount of length in the one or more lifting straps 13 becomes reduced, which in turn causes the storage box/container 12 to rise. As shown in FIGS. 1A and 1B, the one or more lifting straps 13 are in the fully extended state meaning that there is no part of the one or more lifting straps 13 that is wrapped around the main drive shaft 15.

FIGS. 2A and 2B show a side view of the overhead storage system 10 in the raised position and an end view of the overhead storage system in the raised position, respectively.

Similar to FIGS. 1A and 1B, FIGS. 2A and 2B show a lifting motor 11, one or more lifting straps 13, a main drive shaft 15, a storage box/container 12, and one or more rollers 14 for the one or more lifting straps 13 allowing the storage box/container 12 to be raised and lowered. As shown in FIGS. 2A and 2B, when the overhead storage system 10 is in the raised position, the lifting straps 13 have more strap that is wrapped around the main drive shaft 15 meaning that the one or more lifting straps 13 are in a less extended position then when they are in the lowered position. Note that the lifting straps 13 are shorter in FIGS. 2A and 2B relative to FIGS. 1A and 1B. When the one or more lifting straps 13 are in the less extended position, the storage box/container 12 is in a raised position allowing goods/objects to be stored in the storage box/container 12 in a position that is raised (e.g., out of the way of things on the floor). Accordingly, an individual would load goods/objects into the storage box/container 12 in the lower position of FIGS. 1A and 1B, and then raise the overhead storage system 10 as shown in FIGS. 2A and 2B so that they are out of the way.

FIGS. 3A and 3B show how the lifting of the overhead storage system 10 occurs. FIGS. 3A and 3B show cross sectional views of the main drive shaft and lifting straps 13 in the lowered (e.g., completely extended) position (3A) and in a position wherein the overhead storage system 10 is starting to go into the raised position (3B). FIG. 3A and FIG. 3B show the lifting mechanism structure 30, which corresponds to a point of view that is behind the one or more rollers 14 shown in FIG. 1A and FIG. 2A. In FIG. 3A, lifting strap 13a and 13b passes through main drive shaft 15 at main drive shaft holes 15a and 15b. As can be seen in FIGS. 1A and 3B, when lifting motor 11 turns main drive shaft 15 in the clockwise direction shown by arrow 31, the consequence is that lifting strap 13a and 13b starts to wrap around main drive shaft 15. FIG. 3B shows the lifting mechanism structure 30 when the main drive shaft 15 has been rotated roughly 90 degrees. By continuing to rotate the main drive shaft 15 more than 90 degrees in the direction of arrow 31, the lifting strap 13a and 13b continues to wrap more around main drive shaft 15 consequently shortening the lifting strap meaning that the overhead storage system 10 continues to proceed in a direction that raises the overhead storage system. It should be note that the overhead storage system can be designed to raise the storage box/container 12 to any height simply by continuing to rotate the main drive shaft 15 in a clockwise direction. The main drive shaft 15 may be rotated a plurality of times (for example, 360 degrees, 720 degrees, 1080 degrees, 1540 degrees or more) depending on how high one wants to raise the storage box/container 12. It should be noted that the rotation of the main drive shaft 15 in a counterclockwise direction from the unwound state (as shown in FIG. 3A) will have the same consequence as rotating the main drive shaft clockwise, and cause the storage box/container 12 to rise.

Once the storage box/container 12 is in the elevated position, one can lower the storage box/container 12 simply by rotating the main drive shaft 15 in the opposite direction that one used to get the storage box/container 12 to rise.

In an embodiment, the end of the lifting strap that is adjacent to 13a may be attached to a first connection point on the storage box/container 12 with the lifting straps 13 over one or more rollers that are attached to brackets that may be attached to overhead rafters, or overhead joists, or the building's main structure that is overhead. The end of the lifting strap adjacent to 13b (in the direction of arrow 32) may be attached to a second connection point on the storage box/container 12. Alternatively, the ends may arranged in the opposite direction so that the end of the lifting strap adjacent to 13b (in the direction of arrow 32) may be attached to a first connection point of the storage box/container 12 and the end of the lifting strap adjacent to 13a may be attached to a second connection point of the storage box/container 12.

FIGS. 4A and 4B show the overhead storage system in the lowered position and show how the overhead storage system may be connected to overhead rafters, or overhead joists, or a building's main structure. FIG. 4B shows an end view of FIG. 4A that has been rotated 90 degrees in a counterclockwise direction. It should be noted that as can be surmised by FIGS. 4A and 4B, there are lifting straps 13 (broken down into 13a, 13b, and 13c in FIGS. 4A and 4B). In the embodiment shown, the lifting straps 13a, 13b, and 13c connect to the storage box/container 12 in four places. Three of the connection points are shown in FIGS. 4A and 4B with those being the connection point that is the intersection between lifting straps 13a, 13b, and 13c and storage box/container 12. It should be noted that 13d is not shown in either FIG. 4A or 4B. In FIG. 4A, lifting strap 13d is behind lifting strap 13c and in FIG. 4B, it is behind 13b. As can be seen in FIG. 4A, there exist brackets 42 that are secured into the rafter/ceiling 46 by bolts 41. The brackets 42 support rollers 14. In an embodiment, there are an equal number of rollers 14 to the number of connection points from the lifting straps 13 to the storage box/container 12 with each of the lifting straps passing through the main drive shaft 15, over the rollers 14, and then to the storage box/container 12 (best seen on the left side of FIG. 4B). It should be noted that the rollers 14 can be any of a plurality of sizes (e.g., diameters) to allow the lifting strap 13 to pass over the rollers 14. The rollers 14 are shown as being slightly larger in FIG. 4A relative to the rollers 14 in FIG. 4B. When the main drive shaft 15 rotates counterclockwise as shown by the arrow in FIG. 4B the lifting straps 13a and 13b (as well as lifting straps 13c and 13d, which are not shown in FIG. 4B) wrap around main drive shaft 15 (as shown in FIGS. 3A and 3B), consequently, the lifting straps 13 become shorter, thereby lifting or raising storage box/container 12. It should be noted that the direction that the main drive shaft 15 rotates is not particularly important as the main drive shaft can rotate either clockwise or counterclockwise and the effect will be the same. Stated differently, no matter what direction the main drive shaft 15 rotates will have the consequence of wrapping the lifting straps 13 around the main drive shaft 15. Rotating the main drive shaft 15 in the opposite direction from the direction that wraps the lifting straps around the main drive shaft 15 will simply unwind the lifting straps 13 thereby unwrapping the lifting straps 13 from around the main drive shaft 15 (making the lifting straps longer and lowering the storage box/container 12). The cross sectional view that is shown in FIG. 4B shows a cross sectional view that allows one to see how lifting straps 13 (13a and 13c) pass though the center of main drive shaft 15 (e.g., through slits in main drive shaft 15), then over rollers 14, then to storage box/container 12.

FIG. 4A also shows that main drive shaft 15 goes from lifting motor 11 to receptacle 45. Receptacle 45 provides some support to the main drive shaft 15, while minimizing the friction that may occur due to the rotation of main drive shaft 15. In an embodiment, receptacle 45 may contain ball bearings and/or grease that allows main drive shaft 15 to rotate while at the same time, having a minimal amount of friction. In an embodiment, receptacle 45 may comprise a hexagonal shaft adaptor as shown in for example, FIG. 5B. The hexagonal shaft adaptor is allowed to rotate in the receptacle with a minimal amount of friction allowing main drive shaft 15 to rotate also with this minimal amount of friction. Receptacle 45 is secured to the rafter/ceiling 46 by one or more bolts 44. Similarly, lifting motor 11 may be secured to the rafter/ceiling 46 by one or more bolts 43. Having secured the lifting motor 11 at one end of the main drive shaft 15 and the receptacle 45 at the other end of the main drive shaft 15 by bolts into the rafter/ceiling 46 provides sufficient support so as to be able to support the lifting straps 13 and the storage box/container 12 and goods/items that may be placed in or on the storage box/container 12.

In one embodiment, the receptacle 45 may be a pillow block bearing (also known as a pillar block bearing).

Figure 5A:
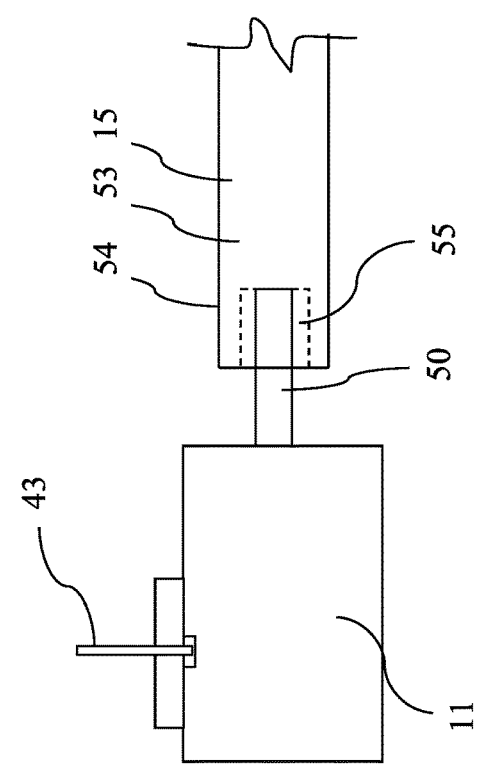

FIGS. 5A and 5B and show expanded views of the lifting motor from a side view (5A) and an end view (5B) and how the lifting motor may be attached to the ceiling or overhead structure. In FIGS. 5A and 5B, the lifting motor 11 is able to rotate a hex drive shaft 50 and hex drive shaft 50 fits in a hex adaptor 55 that adapts the hex drive shaft 50 to the inside diameter 53 of main drive shaft 15 allowing main drive shaft 15 to rotate. The lifting motor is supported by one or more bolts 43 that attach to an overhead structure 46. It should be noted that the lifting motor 11 may not be directly connected to the ceiling or overhead structure but may be connected through a board or by connecting it to some other means to have it connected to an overhead structure.

The main drive shaft 15 has slits in it as was referenced with regard to FIGS. 3A and 3B which allow the lifting straps 13 to wrap around the main drive shaft 15 as it rotates in a direction perpendicular to its access allowing the storage box/container 12 to be raised and lowered as discussed herein.

As shown in FIG. 5A, the outer diameter 54 of main drive shaft 15 is of a size that allows it to fit into a hole in receptacle 45 (e.g., a pillow block bearing) at the opposite end of main drive shaft 15 (not shown). As was discussed previously, the hole in the receptacle is able to accommodate the main drive shaft 15 and allow its rotation with a minimal amount of friction so that the main drive shaft 15 can rotate without the attendant rotation of the receptacle (which is bolted to an overhead structure).

In order that the main drive shaft 15 has sufficient strength to support the lifting straps 13, the storage box/container 12 and goods/items that may be placed in or on the storage box/container 12, it is preferred that the main drive shaft 15 be made of a material that is designed to support this weight. In an embodiment, the main drive shaft 15 may be made of one or more of steel tubing, stainless tubing, titanium tubing, high strength non-ferrous tubing, or combinations thereof. Although the main drive shaft 15 is shown as being cylindrical in shape, it should be understood that other shapes are contemplated and therefore within the scope of the invention. The main drive shaft can be any shape that allows the passage of the lifting straps through it. For example, the main drive shaft may have a cross sectional area that is triangular, square, pentagonal, hexagonal, heptagonal, octagonal, etc. in shape. The receptacle would also be designed to accommodate the shape of the main drive shaft in this instance.

The storage box/container 12 may be made of wood, metal, plastic, or FRP (fiber reinforced plastic) e.g., fiber glass, or combinations thereof. The storage box/container can also be any dimensions or any shape depending on needs of the individual.

The lifting straps can be made of any material that is sufficient to support the storage box/container. It is generally desired that the lifting straps be able to survive continued and lengthy use. Materials that may be used include manmade or natural materials for straps. Materials that might be used include nylon, heavy duty polyester webbing, various other polymers or plastics, hemp, other natural fibers, or combinations thereof.

The bolts used to connect the brackets to the rafter/ceiling may be steel lag bolts or stainless steel lag bolts, or combinations may be used.

Although the overhead storage system has been described as being attached to rafters or the ceiling, it should be understood that any overhead structure that has sufficient stability to support the overhead storage system can be used. For example, the overhead storage system may be connected to ceiling joists regardless of joists orientation. Moreover, the overhead storage system may in an embodiment be attached to I-joists.

In an embodiment, the present invention relates to an overhead storage system comprising one or more lifting straps, a main drive shaft, a lifting motor, and a container, rack, or shelving for goods, the lifting motor being operationally connected to the main drive shaft, the main drive shaft being operationally connected to the one or more lifting straps, said overhead storage system being able to rise or lower the container, rack, or shelving for goods by action of the lifting motor and the main drive shaft, the lifting motor rotating the main drive shaft causing the one or more lifting straps to wrap around the main drive shaft, which raises or lowers the container, rack, or shelving for goods.

In an embodiment, the lifting motor rotates the main drive shaft in a direction that is around an axis that is along a length of the main drive shaft.

In a variation, the lifting motor rotates the main drive shaft in a clockwise direction.

In a variation, two lifting straps are present. In a variation, three or more lifting straps are present. In a variation, four lifting straps are present.

In an embodiment, there are two lifting straps and the two lifting straps comprise a first end and a second end, the first end being distal to the second end, the first end being attached to a a first connection point on a container, rack or shelving for goods and the second end being attached to a second connection point for the container, rack, or shelving for goods.

In an embodiment, the structure overhead is a joist or an overhead rafter. The structure overhead may be a permanent building structure that is not a joist or an overhead rafter. The structure overhead may be a j screw or eye needle screw designed to accommodate the lifting straps.

In an embodiment, the one or more lifting straps pass through holes/slits in the main drive shaft. The holes/slits are of a size that allows accommodation of the one or more lifting straps.

In an embodiment, the main drive shaft is capable of rotating 360 degrees or more. In an embodiment, the main drive shaft is capable of rotating in both a clockwise and counterclockwise direction.

In an embodiment, the present invention relates to methods of storing goods in an overhead position, said method comprising placing goods in an overhead storage system that is capable of being raised and lowered, said overhead storage system comprising one or more lifting straps, a main drive shaft, a lifting motor, and a container, rack, or shelving for goods, placing the goods in the container, rack, or shelving for goods when the container, rack, or shelving for goods is in a lowered position, and subsequently raising the container, rack, or shelving for goods that contains the goods into a raised position or an overhead position, wherein the container, rack, or shelving for goods that contains the goods is raised by having the lifting motor rotate the main drive shaft, which causes the one or more lifting straps to wrap around the main drive shaft, thereby raising the container, rack, or shelving for goods that contains the goods.

In a variation of the method, the lifting motor rotates the main drive shaft in a direction that is around an axis that is along a length of the main drive shaft.

In a variation, the lifting motor rotates the main drive shaft in a clockwise direction.

In a variation of the method, two lifting straps are present. In a variation, three or more lifting straps are present. In a variation, four lifting straps are present.

In a variation of the method, the two lifting straps comprise a first end and a second end, the first end being distal to the second end, the first end being attached to a first connection point on the container, rack, or shelving for goods and the second end being attached to a second connection point on the container, rack, or shelving for goods.

In a variation of the method, the structure overhead is a joist or an overhead rafter.

In a variation of the method, the one or more lifting straps pass through holes in the main drive shaft.

In an embodiment, the main drive shaft rotates 360 degrees or more, or alternatively the main drive shaft rotates 720 degrees or more, or alternatively, the main drive shaft rotates 1080 degrees or more.

It is contemplated and therefore within the scope of the invention that any feature that is discussed above can be combined with any other feature to make the devices, apparatuses, systems, and methods of the present invention, even if they are not discussed together. In any event, the invention is defined by the below claims. It should be apparent that minor modifications can be made to the present invention without departing from the spirit and scope of the invention.

I claim:

1. An overhead storage system comprising one or more lifting straps, a main drive shaft, a lifting motor, and a container, rack, or shelving for goods, said overhead storage system being able to raise or lower the container, rack, or shelving for goods by action of the lifting motor and the main drive shaft, wherein the one or more lifting straps pass through slits in the main drive shaft, the lifting motor being configured to rotate the main drive shaft causing the one or more lifting straps that pass through the slits in the main drive shaft to wrap around the main drive shaft, which raises or lowers the container, rack, or shelving for goods.

2. The system of claim 1, wherein the lifting motor rotates the main drive shaft in a direction that is around an axis that is along a length of the main drive shaft.

3. The system of claim 2, wherein the lifting motor rotates the main drive shaft in a clockwise direction.

4. The system of claim 1, wherein the one or more lifting straps comprises two lifting straps.

5. The system of claim 4, wherein the two lifting straps comprise a first end and a second end, the first end being distal to the second end, the first end being attached to a first connection point on the container, rack, or shelving for goods and the second end being attached to a second connection point on the container, rack, or shelving for goods.

6. The system of claim 5, wherein the structure overhead is a joist or an overhead rafter.

7. The system of claim 1, wherein the main drive shaft rotates 360 degrees or more.

8. A method of storing goods in an overhead position, said method comprising placing goods in an overhead storage system that is capable of being raised and lowered, said overhead storage system being connected to a structure overhead, said overhead storage system comprising one or more lifting straps, a main drive shaft, a lifting motor, and a container, rack, or shelving for goods, wherein the one or more lifting straps pass through slits in the main drive shaft, said method comprising placing the goods in the container, rack, or shelving for goods when the container, rack, or shelving for goods is in a lowered position, and subsequently raising the container, rack, or shelving for goods that contains the goods into a raised position or an overhead position, wherein the container, rack, or shelving for goods that contains the goods is raised by having the lifting motor rotate the main drive shaft, which causes the one or more lifting straps that pass through the slits in the main drive shaft to wrap around the main drive shaft, thereby raising the container, rack, or shelving for goods that contains the goods.

9. The method of claim 8, wherein the raising the container, rack, or shelving for goods that contains the goods step further comprises the lifting motor rotating the main drive shaft in a direction that is around an axis that is along a length of the main drive shaft.

10. The method of claim 9, wherein the raising the container, rack, or shelving for goods that contains the goods step further comprises the lifting motor rotating the main drive shaft in a clockwise direction.

11. The method of claim 8, wherein the raising the container, rack, or shelving for goods that contains the goods step further wherein the one or more lifting straps comprises two lifting straps to lift the container, rack, or shelving.

12. The method of claim 11, wherein the raising the container, rack, or shelving for goods that contains the goods step further comprises each of the two lifting straps comprise a first end and a second end, the first end being distal to the second end, the first end being attached to a first connection point on the container, rack, or shelving for goods and the second end being attached to a second connection point on the container, rack, or shelving for goods.

13. The method of claim 12, wherein the raising the container, rack, or shelving for goods that contains the goods step further comprises having the structure overhead be a joist or an overhead rafter.

14. The method of claim 8, wherein the raising the container, rack, or shelving for goods that contains the goods step further comprises the main drive shaft rotating 360 degrees or more.

15. The method of claim 14, wherein the raising the container, rack, or shelving for goods that contains the goods step further comprises the main drive shaft rotating 720 degrees or more.

16. The method of claim 14, wherein the raising the container, rack, or shelving for goods that contains the goods step further comprises the main drive shaft rotating 1080 degrees or more.

* * * * *